Dec. 30, 1947.                B. WALKER                    2,433,409
                    TRACK AND DRIVE FROM DUAL TIRES
                    Filed June 2, 1943          2 Sheets-Sheet 1
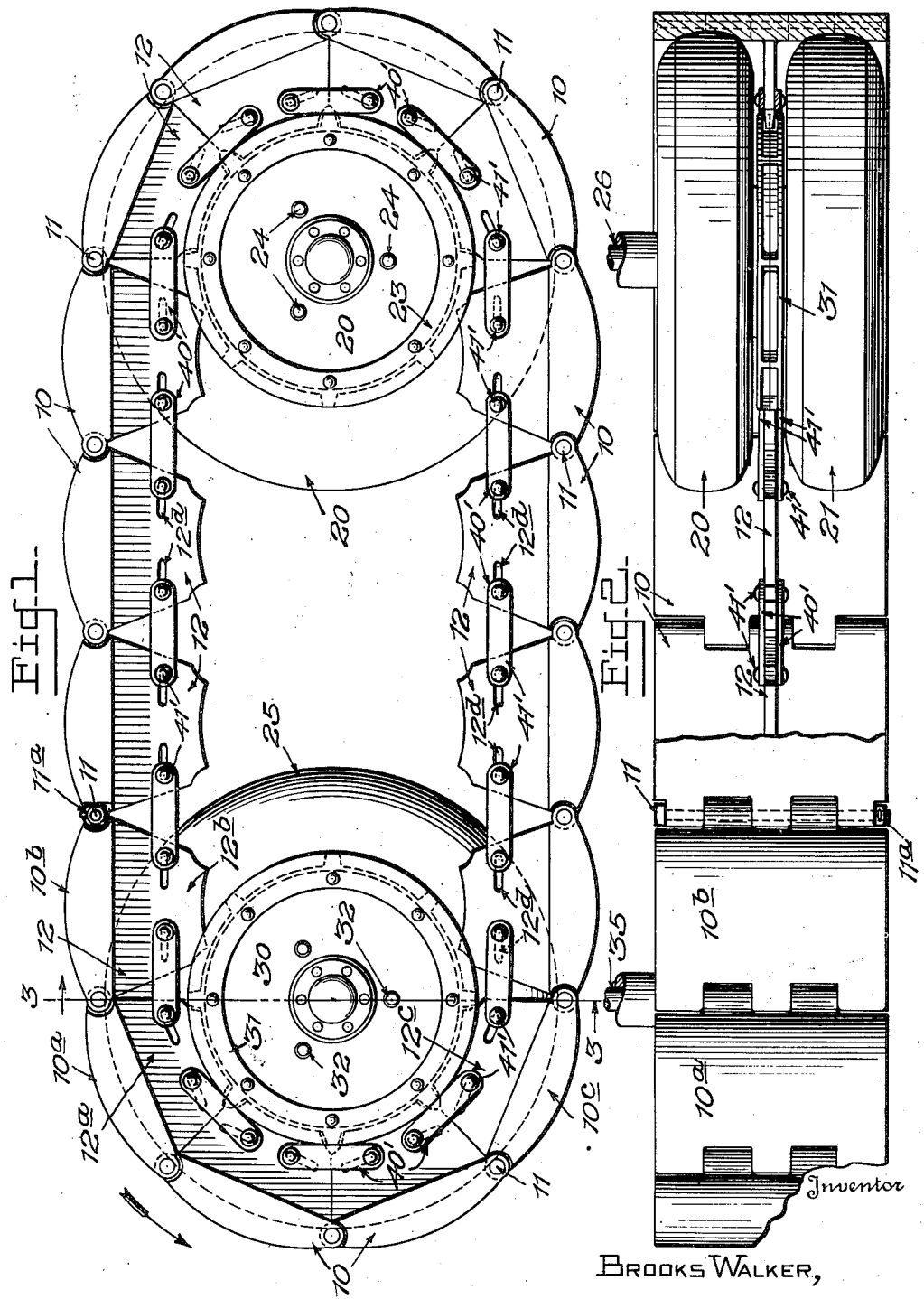
Inventor
BROOKS WALKER,
By C. E. Herrstrom & H. E. Thibodeau
Attorneys

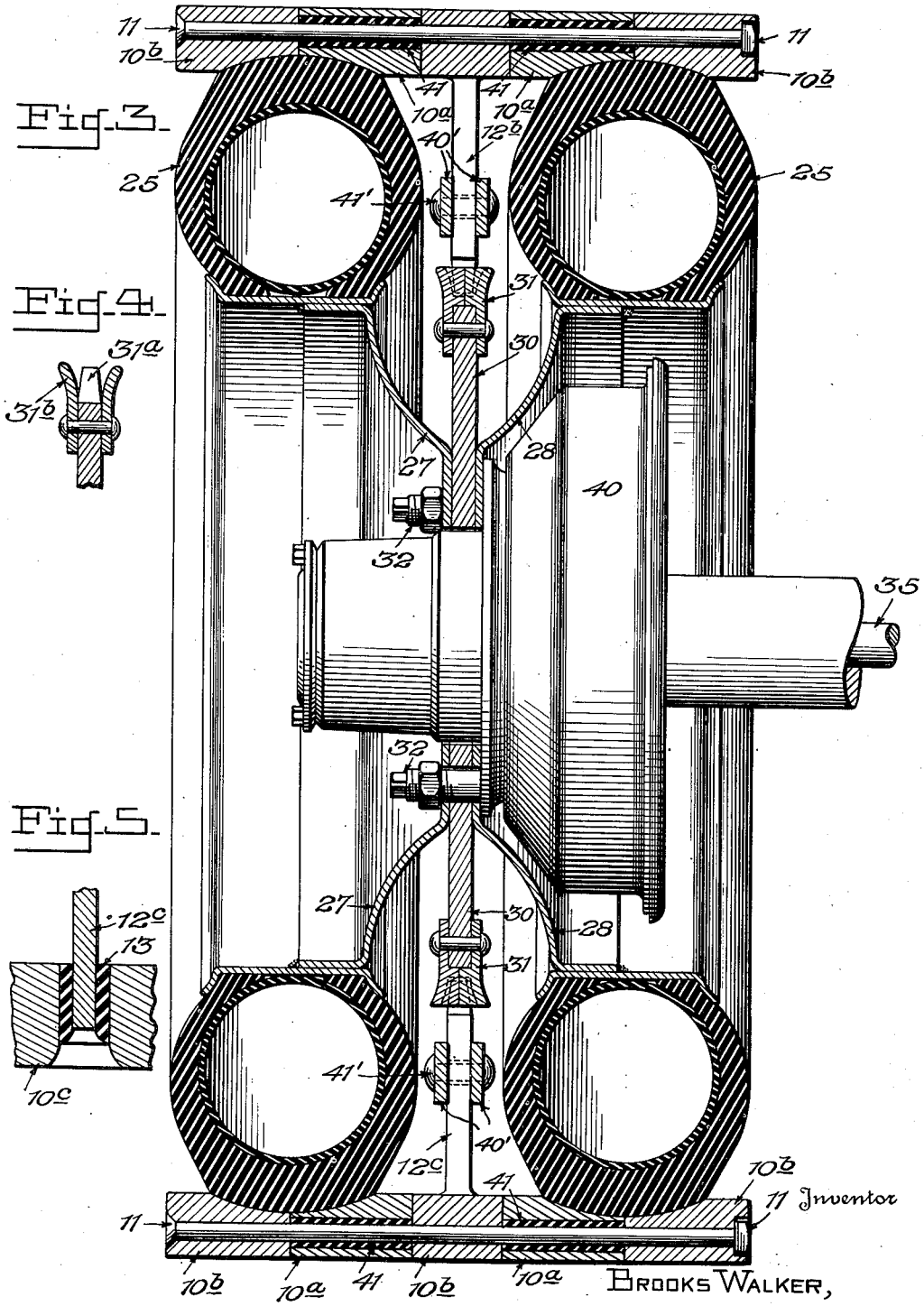

Patented Dec. 30, 1947

2,433,409

UNITED STATES PATENT OFFICE 2,433,409

TRACK AND DRIVE FROM DUAL TIRES

Brooks Walker, Piedmont, Calif.

Application June 2, 1943, Serial No. 489,352

5 Claims. (Cl. 305—8)

(Granted under the act of March 3, 1883, as amended April 30, 1928; 370 O. G. 757)

The invention described herein may be manufactured and used by or for the Government for governmental purposes without the payment to me of any royalty thereon.

This device pertains to a track suitable for attachment to dual tired dual axle trucks for operation in snow, soft ground, sand etc. The device is so constructed that it can be mounted on standard vehicle construction by inserting auxiliary sprockets between the dual tire rear wheel hubs. This sprocket does not interfere with the normal operation of the vehicle on hard ground or pavement when the track is not employed. Each track segment is constructed to have a portion that engages the auxiliary sprocket to form a positive drive. Prior art devices have used sprockets for track drives that extend to or through the wheel diameters and interfere with the operation of the vehicle on hard surface roads with the tracks removed in which case the drive wheels were in contact with the ground.

The sprocket engaging element may be yieldably mounted in the track sections to form a cushion for irregular contacts on the track shoes and against shock from the track shoes to the axle of the vehicle through the sprocket.

Other features of the invention will be more particularly pointed out in the attached specification and claims in which:

Fig. 1 is a side view of one form of my invention.

Fig. 2 is a top view partly in section and partly cut away of the form shown in Fig. 1.

Fig. 3 is an enlarged view partly in section of a section through 3—3 of Fig. 1 except the axle portion.

Fig. 4 is a partial sectional view of an alternate construction of the sprocket.

Fig. 5 is a partial sectional view of an alternate method of attaching the sprocket engaging section to the track shoes.

In all figures like numerals of reference refer to corresponding parts of the various views. In Figs. 1, 2 and 3 is shown a track 10 composed of similar links such as 10A, 10B, 10C, etc., all substantially alike. Hinge pins 11 may be in the metal of the track section or in rubber bushings such as 41 of Fig. 3 or otherwise suitably mounted for track operation in sand and grit. A removable link 11A is provided for assembly or all links can be removable as desired. Pneumatic tires 20, 21 and 25 are the usual rear truck tires used with dual tired dual axle construction.

Each track shoe is provided with an extension such as 12, 12A, 12B, 12C, so formed as to make an external mesh with the drive sprocket 30 and rim 31 when the attached track links are in full contact with tires on the wheels. This drive sprocket 30 and its rim 31 is preferably mounted between the rear wheel flanges 27 and 28 and secured in place by the regular wheel bolts 32. The sprocket can be formed with integral teeth 31a as shown in Fig. 4 and have side plates 31b suitably attached. The flexible bushing 13 shown in Fig. 5 is preferably bonded to extension 12C and track link 10C so as to allow some articulation of the track link 10C relative to extension 12C and some cushion between the track and the axle when running on hard ground, rocks, etc.

As one sprocket drive may be enough, the sprocket on the other pair of wheels may be dispensed with and a guide provided for the sides of the sprocket engaging elements 12, 12A, etc., but with ample room for compression of the tire on impact.

Rubber bushings 41 may be used in the track hinges.

In order that the track may support a load between the two axles it may be desirable to provide links 40' connected by pins or rivets 41' which slide in the slots 12d of the extensions 12 on the track shoes. By these links 40' the track shoes and extensions form a structure that will support a load between the axles without putting a heavy tension tending to draw the axles together as would be the case if the track were free to bend in both directions.

While I have shown a preferred form of my invention, many modifications will be evident and all uses as pointed out here and in the attached claims are a part of this invention.

I claim:

1. In combination with a pair of aligned wheels provided with rubber tires, a sprocket on each wheel and of smaller diameter than the tire thereon, an endless chain of articulated links trained over the tires, inwardly extending portions from said links meshing with said sprockets, and another set of links laterally spaced inwardly from said outer links and substantially parallel thereto with slidably connected with the extending portions of said outer links whereby to limit relative movement of adjacent extensions.

2. A combination as set forth in claim 1 wherein said aligned wheels are dual wheels and the sprocket on each wheel is between the wheels thereof.

3. In combination with a pair of aligned dual wheels, each dual wheel having a pair of concentric rubber tires, a sprocket on each wheel between the tires thereof and of smaller diameter than said tires, an endless chain of articulated links trained over said tires, inward extensions from said links meshing with said sprockets having longitudinally extending slotted portions, and a second set of links having pins extending into said slotted portions of said extensions whereby to limit relative movement of adjacent extensions.

4. In combination, a pair of aligned wheels provided with highly resilient tires, a sprocket on one wheel of smaller diameter than said tire when in a compressed position, an endless chain of articulated links trained over the tires, track shoes carried by said links, inwardly extending portions from said links meshing with said sprockets, and yieldable means between said track road bearing surface and said sprockets.

5. In combination, a pair of aligned wheels provided with highly resilient tires, a sprocket on one wheel of smaller diameter than said tire when in a compressed position, an endless chain of articulated links trained over the tires, track shoes carried by said links, inwardly extending portions from said links meshing with said sprockets, and yieldable means between said track links and said extensions which mesh with said sprockets to allow relative radial motion between said track shoes and said sprockets when said shoes encounter bumps on the surface being traversed.

BROOKS WALKER.

REFERENCES CITED

The following references are of record in the file of this patent:

UNITED STATES PATENTS

| Number | Name | Date |
| --- | --- | --- |
| 1,318,553 | Harrison | Oct. 14, 1919 |
| 1,639,536 | Saives | Aug. 16, 1927 |
| 1,673,102 | Christie | June 12, 1928 |
| 1,687,834 | Frederickson | Oct. 16, 1928 |
| 1,828,375 | Moore | Oct. 20, 1931 |
| 1,762,770 | Sargent | June 14, 1932 |
| 1,888,420 | Barnes | Nov. 22, 1932 |
| 1,931,522 | Barnes | Oct. 24, 1933 |